(12) United States Patent
Durkee et al.

(10) Patent No.: US 10,853,764 B2
(45) Date of Patent: Dec. 1, 2020

(54) STORAGE CART PROVIDING ITEM STORAGE VERIFICATION

(71) Applicant: Walmart Apollo, LLC, Bentonville, AR (US)

(72) Inventors: Paul Durkee, Centerton, AR (US); Ragen Turner, Bentonville, AR (US); James Benjamin Edwards, Fayetteville, AR (US); Nicole Morales, Bentonville, AR (US); Stuart Clark, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 73 days.

(21) Appl. No.: 16/231,387

(22) Filed: Dec. 21, 2018

(65) Prior Publication Data
US 2020/0065748 A1 Feb. 27, 2020

Related U.S. Application Data

(60) Provisional application No. 62/720,919, filed on Aug. 21, 2018.

(51) Int. Cl.
*G06Q 10/08* (2012.01)
*G06Q 30/06* (2012.01)
*G06K 7/14* (2006.01)

(52) U.S. Cl.
CPC ......... *G06Q 10/087* (2013.01); *G06K 7/1408* (2013.01); *G06Q 30/0603* (2013.01); *G06Q 30/0639* (2013.01); *G06Q 30/0641* (2013.01)

(58) Field of Classification Search
CPC ........ G06Q 10/08; G06Q 10/087; G06G 1/14; F25D 3/06
See application file for complete search history.

(56) References Cited

U.S. PATENT DOCUMENTS

| | | |
|---|---|---|
| 6,775,588 B1 | 8/2004 | Peck |
| 7,516,848 B1 | 4/2009 | Shakes et al. |
| 7,894,933 B2 | 2/2011 | Mountz et al. |
| 8,019,463 B2 | 9/2011 | Peck |
| 9,365,315 B2 | 6/2016 | Kim et al. |

(Continued)

FOREIGN PATENT DOCUMENTS

WO 2017197285 A1 11/2017

OTHER PUBLICATIONS

Unknown, "Selecting the Right Mobile Pick Cart to Support Batch Picking", Lightning Pick, date unknown, pp. 1-8.

*Primary Examiner* — Oluseye Iwarere

(57) ABSTRACT

Examples provide an item storage cart for verifying correct item placement into containers on the item storage cart. A cart manager component outputs planogram data identifying a location of a selected item. Weight data generated by one or more weight sensors associated with the set of item storage containers is analyzed to verify whether a correct item is placed in a given storage container on the cart and/or verify a selected item is placed into a correct storage container. The cart manager component determines if an unselected item is removed from a storage container and/or if an unselected item is added to a storage container. A notification is output if an incorrect item is added to a cart, an incorrect item is removed from the cart, an item is added to the wrong container or removed from the wrong container.

6 Claims, 11 Drawing Sheets

(56) References Cited

U.S. PATENT DOCUMENTS

| | | | | |
|---|---|---|---|---|
| 9,916,561 B2* | 3/2018 | Marathe | | G06Q 10/087 |
| 10,121,034 B1* | 11/2018 | Bathurst | | G06Q 10/087 |
| 10,318,919 B2* | 6/2019 | Bermudez Rodriguez | | G06Q 10/087 |
| 2007/0215700 A1* | 9/2007 | Reznik | | G06Q 10/08 |
| | | | | 235/385 |
| 2008/0230603 A1* | 9/2008 | Stawar | | B62B 3/1408 |
| | | | | 235/383 |
| 2008/0231431 A1* | 9/2008 | Stawar | | B62B 3/142 |
| | | | | 340/425.5 |
| 2008/0231432 A1* | 9/2008 | Stawar | | B62B 3/1424 |
| | | | | 340/425.5 |
| 2008/0237339 A1* | 10/2008 | Stawar | | G06Q 30/0633 |
| | | | | 235/383 |
| 2008/0243626 A1* | 10/2008 | Stawar | | G06Q 30/02 |
| | | | | 705/23 |
| 2014/0214577 A1* | 7/2014 | Acker, Jr. | | G07G 1/0081 |
| | | | | 705/23 |
| 2014/0214596 A1* | 7/2014 | Acker, Jr. | | G06Q 20/20 |
| | | | | 705/26.8 |
| 2015/0127496 A1* | 5/2015 | Marathe | | G06Q 10/087 |
| | | | | 705/28 |
| 2015/0223890 A1* | 8/2015 | Miller | | G06F 21/6245 |
| | | | | 705/2 |
| 2015/0223891 A1* | 8/2015 | Miller | | G06F 21/44 |
| | | | | 726/19 |
| 2015/0223892 A1* | 8/2015 | Miller | | A61B 50/18 |
| | | | | 345/174 |
| 2016/0260054 A1 | 9/2016 | High et al. | | |
| 2017/0161703 A1* | 6/2017 | Dodia | | G06K 19/06028 |
| 2017/0309136 A1* | 10/2017 | Schoner | | G07G 1/0045 |
| 2018/0089474 A1* | 3/2018 | Ramon | | B65G 1/137 |
| 2019/0147710 A1* | 5/2019 | Carley | | G08B 5/38 |
| | | | | 340/815.45 |
| 2019/0277552 A1* | 9/2019 | Vu | | F25D 23/025 |
| 2020/0034780 A1* | 1/2020 | Sikka | | G06Q 10/087 |
| 2020/0065748 A1* | 2/2020 | Durkee | | G06Q 30/0641 |

* cited by examiner

STORAGE CART PROVIDING ITEM STORAGE VERIFICATION

BACKGROUND

When stocking or replenishing items on a shelf, a person frequently utilizes a cart or rolling bin to transport the items being stocked onto the shelf. A cart may also be used to hold items removed from a shelf or other display for grocery order fulfillment. The cart may include multiple different bins or totes used to separate different types of items or to fulfill different orders. For example, but without limitation, items for a first order may be stored in a first bin and items to fulfill a second order may be stored in a second bin on the cart. In another example, one bin may be utilized to store cold items and another bin may be used to store non-perishable items. However, if there are more than one or two bins, the picker may have difficulty determining which item goes into which bin. This may result in items being placed in the incorrect bin by mistake. Moreover, the person frequently has difficulty locating items which are to be added to one or more of the bins on the cart. This manual process is inefficient and time-consuming.

SUMMARY

Some examples provide an item storage cart. The cart includes a control device comprising a memory communicatively coupled to at least one processor. A user interface component outputs a location of a selected item within an item selection area. The selected item is identified for placement within a first storage container on the storage cart. The cart includes a housing support member connected to a portion of a base member. The housing support member includes a set of storage container housings on three vertical levels configured to support a set of six storage containers. Each vertical level includes a pair of container housings. The set of storage container housings includes a first container housing at least partially enclosing the first storage container. The first container housing includes an extendable guide that extends to move the first storage container from a closed configuration into an open configuration. In the open configuration, the user is able to access an interior portion of the first storage container. A second container housing in the set of storage container housings encloses a second storage container. The second storage container includes a second extendable guide which holds the second storage container in the closed configuration while in a retracted state. The closed configuration preventing user access to an aperture associated with an interior of the second storage container. A set of one or more weight sensors is associated with the set of container housings. The set of weight sensors generates weight data associated with the first storage container and the second storage container. A cart manager component analyzes the weight data with item data associated with the selected item to verify the selected item is placed into the first storage container. The item data includes a predetermined weight of the selected item.

Other examples provide a rolling storage cart. The rolling storage cart includes a base member having a set of one or more wheels. A housing support member is connected to the base member. The housing support member includes a set of storage container support members supporting a set of storage containers. The set of storage containers includes a first storage container and a second storage container. A first storage container support member includes a first locking mechanism removably securing the first storage container to the first storage container support member in a closed configuration. A second storage container support member includes a second locking mechanism removably securing the second storage container to the second storage container support member in the closed configuration. A cart manager component identifies a selected item for addition to the first storage container or removal from the first storage container. The cart manager component triggers disengagement of the first locking mechanism to release the first storage container while engaging the second locking mechanism to prevent opening of the second storage container. A first set of sensor devices associated with the first storage container generates first sensor data associated with a first set of items within the first storage container. The cart manager component analyzes the first sensor data to verify the selected item is added to the first storage container or removed from the first storage container.

Still other examples provide a computer-implemented method for verifying contents of storage containers on a cart. Scan data identifying an item for placement into at least one storage container on an item storage cart is received from a scanner device. A cart manager component identifies a selected storage container assigned to the identified item. A user interface component outputs a graphical representation of a location of the identified item on an item display within an item selection area. A locking mechanism associated with the selected storage container releases to enable user access to at least a portion of an aperture associated with the selected storage container. An analysis component analyzes weight data generated by a weight sensor associated with at least the selected storage container to verify the identified item is placed into the selected storage container. The locking mechanism re-engages if the weight data indicates a weight increment associated with the selected storage container corresponds with a predetermined weight of the identified item. The user interface device outputs a notification indicating failure to detect placement of the identified item into the selected storage container if a weight increment detected by the weight sensor fails to correspond to a predetermined weight of the identified item.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some examples, . . . ." For brevity and clarity of presentation, this implied leading clause is not repeated ad nauseum.

Referring to the figures, examples of the disclosure enable a mobile item storage cart for verifying contents of containers on the cart. In some examples, the item storage cart includes a cart manager component which analyzes sensor data generated by sensor devices on the cart to verify correct items are placed into correct containers on the cart. If an incorrect item is placed on the cart, the cart outputs a notification or an alert to a user. Likewise, if the correct item is placed into the wrong container on the cart, the cart outputs a notification or an alert. This enables verification of container contents and reduction/prevention of stocking and picking errors.

Figure 1:
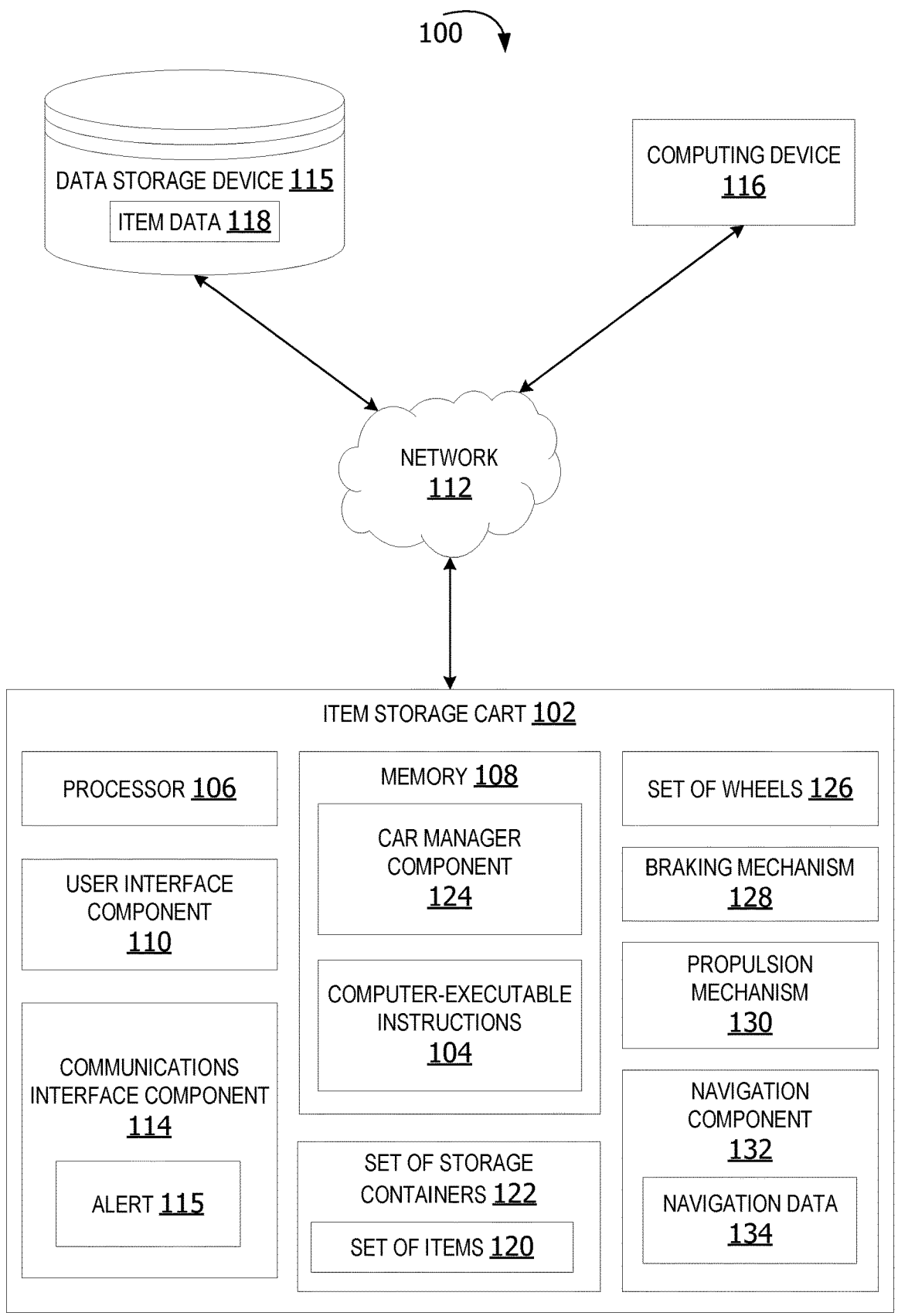
FIG. 1 is an exemplary block diagram illustrating a system for verifying contents of containers on an item storage cart.

Referring again to FIG. 1, an exemplary block diagram illustrates a system 100 for verifying contents of containers on an item storage cart. In the example of FIG. 1, the item storage cart 102 represents any cart for storing items. The item storage cart 102 may be a stocking cart for storing items used to stock a shelf or other item display. The item storage cart 102 may be a pick cart used to store items removed from a shelf or other item display for grocery order fulfillment, pallet build, or other picking task.

An item display in the set of item displays may include shelves, side-counters, end-cap displays, refrigerated displays, freezer compartments, gondola shelves, bins, or any other item display associated with one or more aisle(s) 206 or other areas within an item selection area in a retail environment. An item selection area is a store or other retail space in which one or more items are displayed. An item selection area may include an entire store or an area/department within a store. An item display is sometimes referred to as a modular display, display shelf, end-cap display, counter display or other area in a store in which items in the same or similar category are stored/displayed for viewing by shoppers.

The item storage cart 102 executes computer-executable instructions 104 (e.g., as application programs, operating system functionality, or both) to implement the operations and functionality associated with the item storage cart 102. In some examples, the item storage cart 102 has at least one processor 106 and a memory 108. The item storage cart 102 may also include a user interface component 110.

The processor 106 includes any quantity of processing units and is programmed to execute the computer-executable instructions 104. The computer-executable instructions 104 may be performed by the processor 106 or by multiple processors within the item storage cart 102 or performed by a processor external to the item storage cart 102. In some examples, the processor 106 is programmed to execute instructions such as those illustrated in the figures (e.g., FIG. 13 and FIG. 14).

The item storage cart 102 further has one or more computer-readable media such as the memory 108. The memory 108 includes any quantity of media associated with or accessible by the item storage cart 102. The memory 108 may be internal to the item storage cart 102 (as shown in FIG. 1), external to the computing device (not shown), or both (not shown).

The memory 108 stores data, such as one or more applications. The applications, when executed by the processor 106, operate to perform functionality on the item storage cart 102. The applications may communicate with counterpart applications or services such as web services accessible via a network 112. For example, the applications may represent downloaded client-side applications that correspond to server-side services executing in a cloud.

In other examples, the user interface component 110 includes a graphics card for displaying data to the user and receiving data from the user. The user interface component 110 may also include computer-executable instructions (e.g., a driver) for operating the graphics card. Further, the user interface component 110 may include a display (e.g., a touch screen display or natural user interface) and/or computer-executable instructions (e.g., a driver) for operating the display. The user interface component 110 may also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor.

The network 112 is implemented by one or more physical network components, such as, but without limitation, routers, switches, network interface cards (NICs), and other network devices. The network 112 may be any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 may be a local or private LAN.

In some examples, the system 100 optionally includes a communications interface component 114. The communications interface component 114 includes a network interface card and/or computer-executable instructions (e.g., a driver) for operating the network interface card. Communication between the item storage cart 102 and other devices, such as but not limited to the data storage device 115 and/or a remote computing device 116, may occur using any protocol or mechanism over any wired or wireless connection. In some examples, the communications interface component 114 is operable with short range communication technologies such as by using near-field communication (NFC) tags.

The computing device 116 represents any device executing computer-executable instructions. The computing device 116 may include a mobile computing device or any other portable device. In some examples, the computing device 116 includes a mobile telephone, laptop, tablet, computing pad, netbook, gaming device, and/or portable media player. The computing device 116 may also include fewer portable devices such as servers, desktop personal computers, kiosks, or tabletop devices. Additionally, the computing device 116 may represent a group of processing units or other computing devices. In some examples, the computing device 116 has at least one processor and a memory. The computing device 116 may also include a user interface component.

The data storage device 115 may include one or more different types of data storage devices, such as, for example, one or more rotating disks drives, one or more solid state drives (SSDs), and/or any other type of data storage device. The data storage device 115 in some non-limiting examples includes a redundant array of independent disks (RAID) array. In other examples, the data storage device 115 includes a database.

The data storage device 115 in this example is located remotely from the item storage cart 102. In other examples, the data storage device 115 may be included within the item storage cart 102 or associated with the computing device 116. In other examples, the data storage device 115 may be a remote data store, such as, but not limited to, a data storage in a remote data center and/or a cloud storage.

The data storage device 115 stores data utilized for managing the item storage cart and verifying contents of containers on the item storage cart, such as, but not limited to, item data 118 associated with one or more items, such as the set of items 120 in the set of storage containers 122. Item data 118 may include, without limitation, item weight data, item image data, item barcode data, item size data, item location on a display or other shelf, etc.

The set of storage containers 122 is a set of one or more containers for holding or storing one or more items. A storage container in the set of storage containers 122 may include, without limitation, a tote, a basket, a box, a crate, or any other type of container. In some non-limiting examples, the set of storage containers 122 includes six totes.

The memory 108 in some examples stores one or more computer-executable components, such as, but not limited to, a cart manager component 124. The cart manager component 124 analyzes sensor data received from a set of sensor devices to identify a selected item. In some examples, the cart manager component 124 analyzes scan data generated by a barcode scanner scanning a barcode or other item identifier on the selected item to identify the item. If the item is being added to the cart, the cart manager component identifies a container on the cart for placement/storage of the item. The container may be selected based on a per-order basis.

The user interface component 110 in some examples outputs a location of a selected item within an item selection area identified for placement within a first storage container on the storage cart. For example, if a user is picking items to fulfill two different grocery orders and the first order includes a gallon of milk, the cart manager component 124 analyzes scan data generated when the user scans the gallon of milk. The cart manager component identifies the container linked to the first order and assigns the gallon of milk to that container.

In other examples, the cart manager component 124 analyzes sensor data generated by a sensor device associated with a selected storage container to determine whether the user slides the selected storage container open or otherwise accesses an interior portion of the selected storage container. For example, the sensor device may be implemented as a pressure sensor, a light sensor or other sensor device capable of detecting movement of the container as the storage container slides outward to provide access to the interior of the container.

The cart manager component 124 in still other examples analyzes weight data generated by one or more weight sensors associated with each storage container on the item storage cart 102. The weight sensors detect increases in weight (weight increment) and/or weight decrease (weight decrement) associated with a selected container. The cart manager component 124 compares the predetermined/known weights of one or more items, known weight of the empty container and/or other item data 118 to determine whether a selected item (scanned item) is added to a given storage container.

In still other examples, the cart manager component 124 analyzes weight data to detect unauthorized removal of items from the cart and/or unauthorized addition of items to the cart. For example, if a third party removes one or more items from one or more of the storage containers on the cart, the cart manager component 124 detects the decrease in weight for the one or more storage containers. The cart manager component 124 sends out a notification or emits an alert 115 to notify a user of the removal of the item(s) via the communications interface component 114 in some examples. In other examples, the alert 115 is output to the user via the user interface component 110.

Likewise, the cart manager component 124 analyzes weight data generated by sensor devices on the set of storage containers 122 using item data 118 to determine whether an incorrect item or an incorrect number (wrong quantity) of items is added to any of the storage containers. If an incorrect item is added, the cart manager component 124 sends out a notification or emits the alert 115 to notify a user of the addition of the incorrect item and/or incorrect number of items.

The alert 115 in some examples is an audible alert, such as, but not limited to, a beeping, a verbal alert (recorded message), an alarm, or other sound. In other examples, the alert 115 is a visual alert, such as, but not limited to, a text message, a light, a video display, a graphical image, or other visual notification. The alert 115 optionally includes a haptic alert, such as a vibration or other haptic output. In still other examples, the alert 115 is a combination of a visual alert, an audible alert and/or a haptic alert. For example, the alert 115 in one example is a blinking light accompanied by an audible beeping sound and a vibration output by a user interface device. In another example, the alert 115 is a text notification accompanied by an audible voice reading the text aloud.

The item storage cart 102 in this non-limiting example is a cart including a set of wheels 126 which is pushed or pulled by a user. In other examples, the item storage cart 102 is a self-propelled/motorized cart. In these examples, the item storage cart includes a braking mechanism 128 and a propulsion mechanism 130 coupled to the set of wheels 126. The propulsion mechanism 130 includes a power source, such as, but not limited to, an electric battery, solar panels and/or an electric motor. A navigation component 132 provides navigational data 134 to the propulsion mechanism 130 to enable the cart to move autonomously from a first location to a second location via self-propulsion.

In one non-limiting example, if the cart manager component detects a weight increase (variance) outside preconfigured threshold, the braking mechanism 128 automatically stops/brakes. In other words, if a weight threshold is exceeded, the cart automatically places itself into park (park mode) stopping/preventing the cart from moving until the weight on the cart is reduced/falls below the maximum weight limit. This prevents damage to the cart and/or prevents potential risk to operators of the cart. For example, if a child or animal jumps on the cart, the weight addition due to the child or animal resulting in the cargo weight exceeding the maximum weight threshold results in the braking mechanism applying the brakes or the cart manager component otherwise shutting down the propulsion system to stop autonomous movement of cart.

Figure 2:
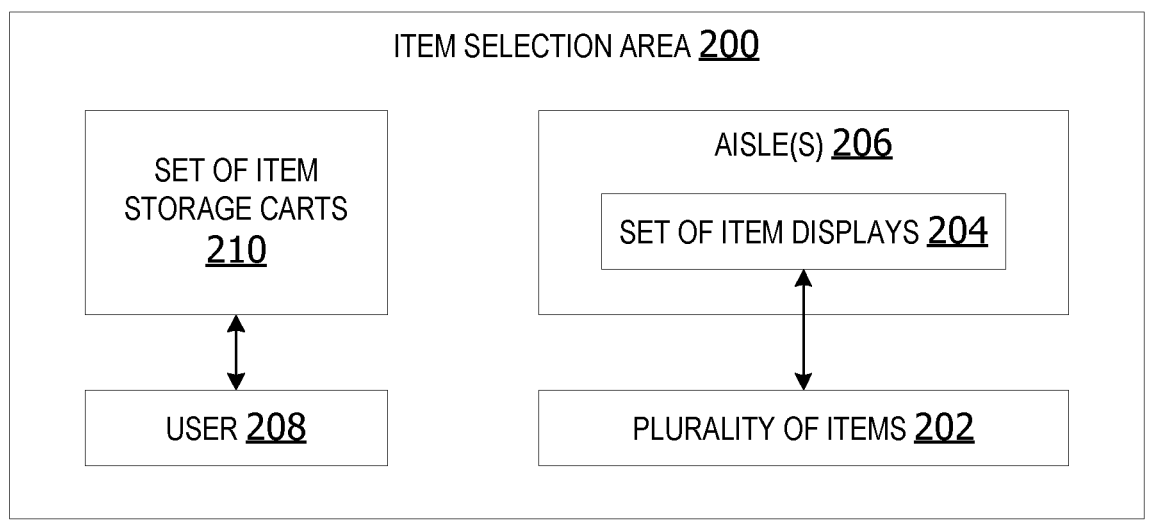
FIG. 2 is an exemplary block diagram illustrating an item selection area.

FIG. 2 is an exemplary block diagram illustrating an item selection area 200. The item selection area 200 may include an interior portion of a store, an exterior portion of a store, a portion of a store, an area within a store, a department, a storage area and/or any other retail environment. For example, an item selection area may include a grocery store, a warehouse, a distribution center, a garden center, a dairy section, a paper goods aisle, etc.

The item selection area 200 includes a plurality of items 202 associated with one or more display areas in a set of item displays 204. The plurality of items 202 includes two or more items. The plurality of items 202 in some examples includes items, such as, but not limited to, the set of items 120 in FIG. 1.

A user 208 in some examples utilizes a set of item storage carts 210 to pick/gather items from the set of items displays 204 for order fulfillment, pallet build, or other shopping tasks. The set of item storage carts 210 includes one or more item storage carts, such as, but not limited to, the item storage cart 102 in FIG. 1.

In other examples, the user 208 utilizes a cart in the set of item storage carts 210 to stock/replenish one or more item displays with additional items stored on the cart(s). A cart in the set of item storage carts 210 is a storage cart including a set of storage containers (totes), such as, but not limited to, the item storage cart 102 in FIG. 1.

Figure 3:
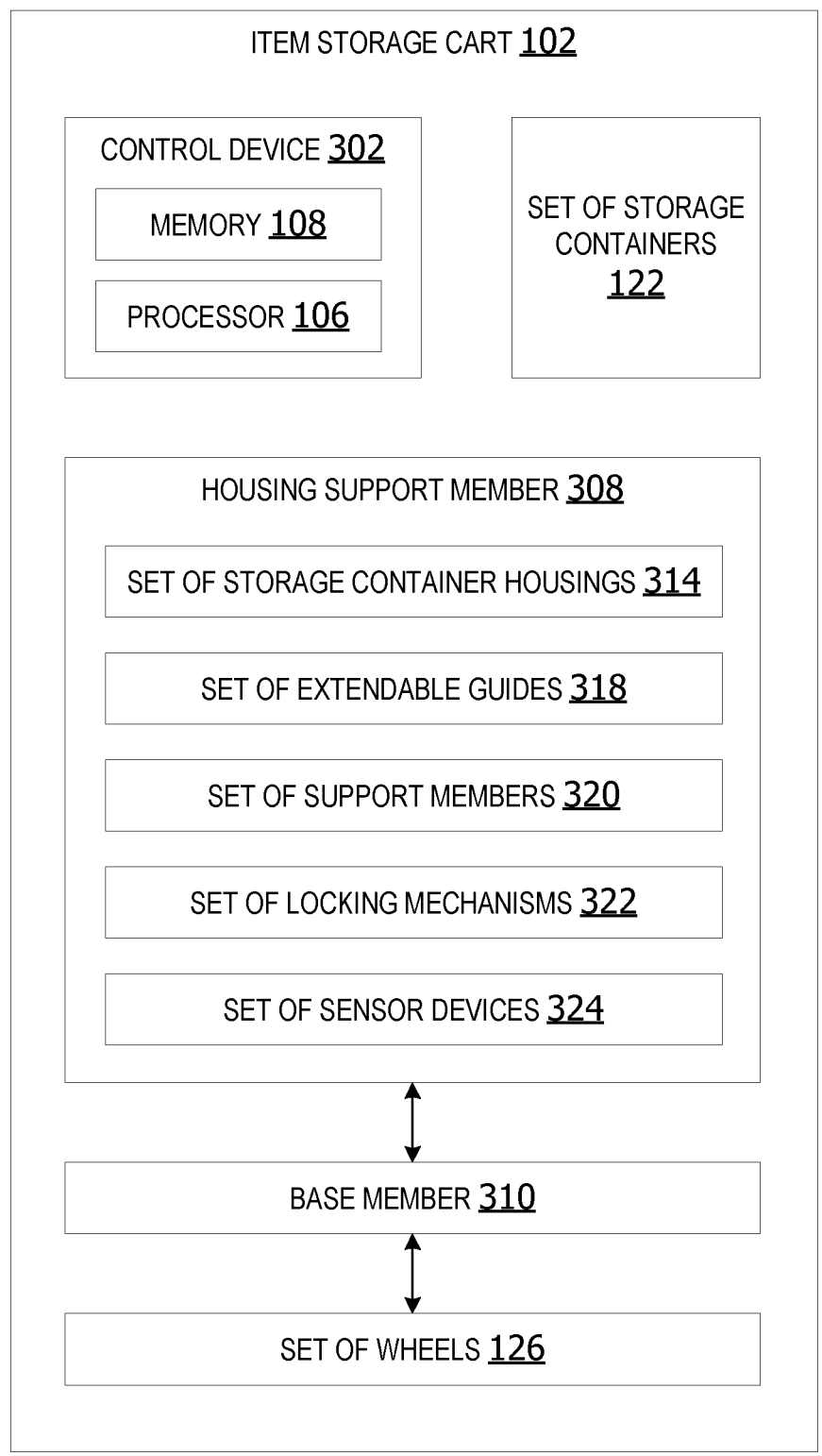
FIG. 3 is an exemplary block diagram illustrating an item storage cart.

FIG. 3 is an exemplary block diagram illustrating an item storage cart 102. The item storage cart 102 in some examples is a cart, such as, but not limited to, one or more of the carts in the set of item storage carts 210 in FIG. 2.

The item storage cart 102 includes a control device 302. The control device 302 includes a memory 108 communicatively coupled to at least one processor 106. The control device 302 may be utilized to execute the cart manager component.

The item storage cart 102 includes a housing support member 308 connected to a portion of a base member 310. The base member 310 includes the set of wheels 126 enabling the item storage cart 102 to be pushed, pulled, driven or moved from one location to another location. The housing support member 308 includes a set of storage container housings 314 on one or more vertical levels configured to support the set of storage containers 122. In some non-limiting examples, the item storage cart 102 includes six storage containers supported on the set of storage container housings.

In some examples, the item storage cart 102 includes a set of extendable guides 318 configured to at least partially extend or push one or more storage container from a closed configuration into an open configuration. In these examples, each storage container is removably connected to an extendable guide. When the extendable guide is fully retracted, the storage container is in a closed configuration in which the interior portion of the container is inaccessible. When the extendable guide extends horizontally, it pushes or slides the storage container outward into an open configuration enabling user access to at least a portion of an interior of the storage container.

The item storage cart 102 may include a set of support members 320 connected to the housing support member 308. Each storage container in the set of storage containers 122 rests on at least one support member in the set of support members. The support members may be arranged vertically in one or more levels. In this non-limiting examples, the support members include a set of three support members for supporting one or more containers on three levels.

A set of locking mechanisms 322 may be optionally included in other examples. In these examples, each support member or storage container housing includes a locking mechanism to lock a storage container in the closed configuration. The locking mechanism may include a lock, a latch, a bar, a folding arm, an extending arm, or other mechanism holding the storage container in the closed configuration. When the locking mechanism is released, the storage container is free to be pulled out or slide out to enable user access to the interior of the container. When the locking mechanism associated with a selected storage container is engaged, the selected storage container is incapable of being pulled open, sliding out, or otherwise moving into the open configuration.

The item storage cart 102 includes a set of one or more sensor devices 324. The set of sensor devices may include a set of weight sensors associated with the set of container housings. The set of weight sensors includes a first weight sensor generating weight data associated with each storage container in the set of storage containers 122. The cart manager component analyzes the weight data with item data associated with the selected item, including a predetermined weight of the selected item, to verify correct items are placed into the correct storage containers and/or verify correct items are removed from the correct containers.

Figure 4:
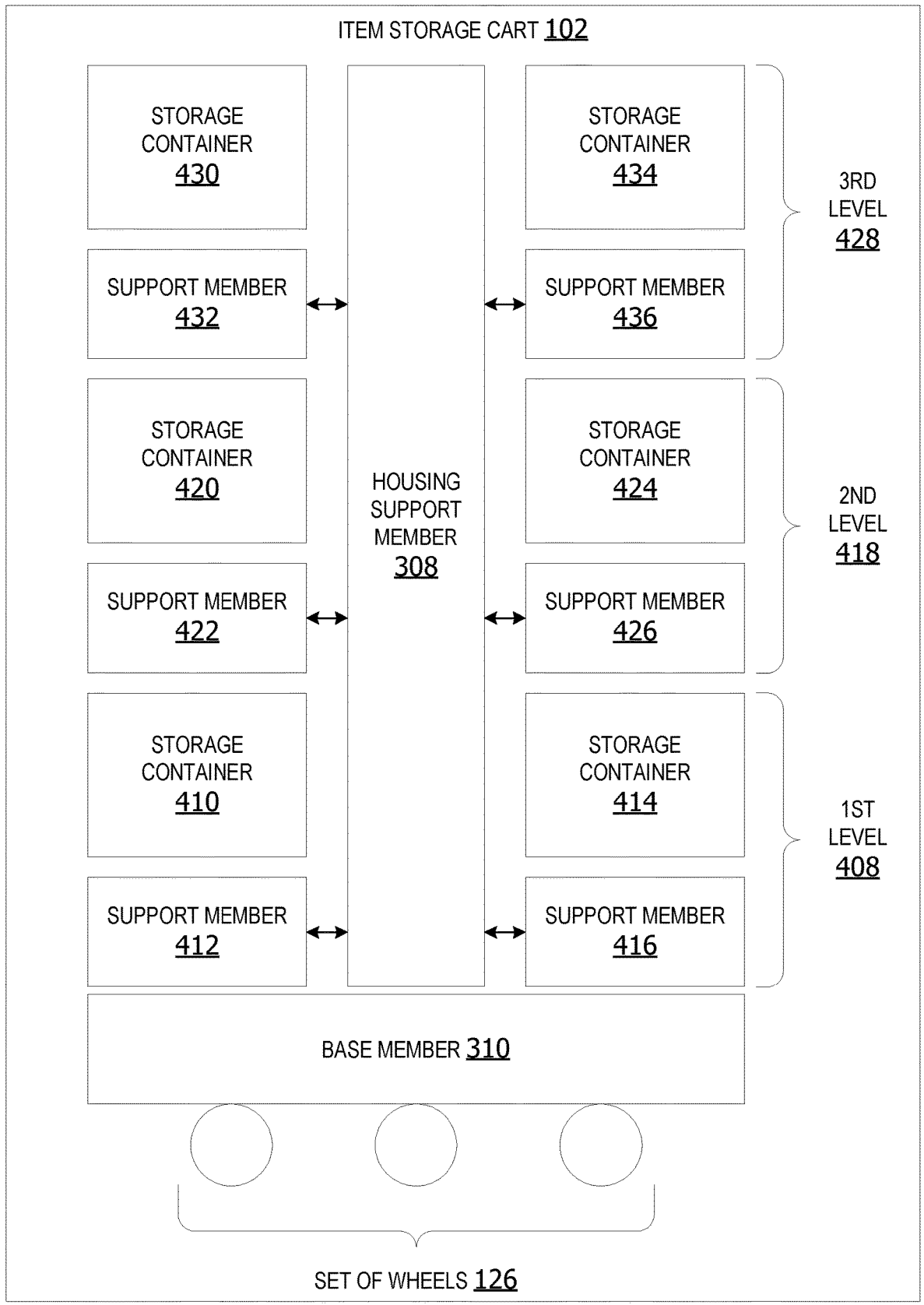
FIG. 4 is an exemplary block diagram illustrating a rolling item storage cart.

FIG. 4 is an exemplary block diagram illustrating a rolling item storage cart. The item storage cart 102 in this example includes the housing support member 308 connected to the portion of the base member 310. The base member 310 includes the set of wheels 126 giving the cart mobility enabling the item storage cart 102 to function as a rolling item storage cart.

The housing support member 308 in some non-limiting examples includes a set of six storage container housings on three vertical levels configured to support a set of six storage containers. Each vertical level in this example includes a pair of container housings.

In this example, the first level includes a first storage container 410 associated with a first support member 412 and a second storage container 414 on a second support member 416. The second level 418 includes a third storage container on a third support member 422 and a fourth storage container 424 on a fourth support member 426. The third level 428 includes a fifth storage container 430 on a fifth support member 432 and a sixth storage container 434 on a sixth support member 436.

The support member 432, support member 422, support member 412, support member 416, support member 426, and/or the support member 436 are support members in a set of members, such as, but not limited to, the set of support members 320 in FIG. 3. The storage container 430, storage container 420, storage container 410, storage container 434, storage container 424 and/or storage container 414 are storage containers in a set, such as, but not limited to, the set of storage containers 122 in FIG. 1 and FIG. 3.

Figure 5:
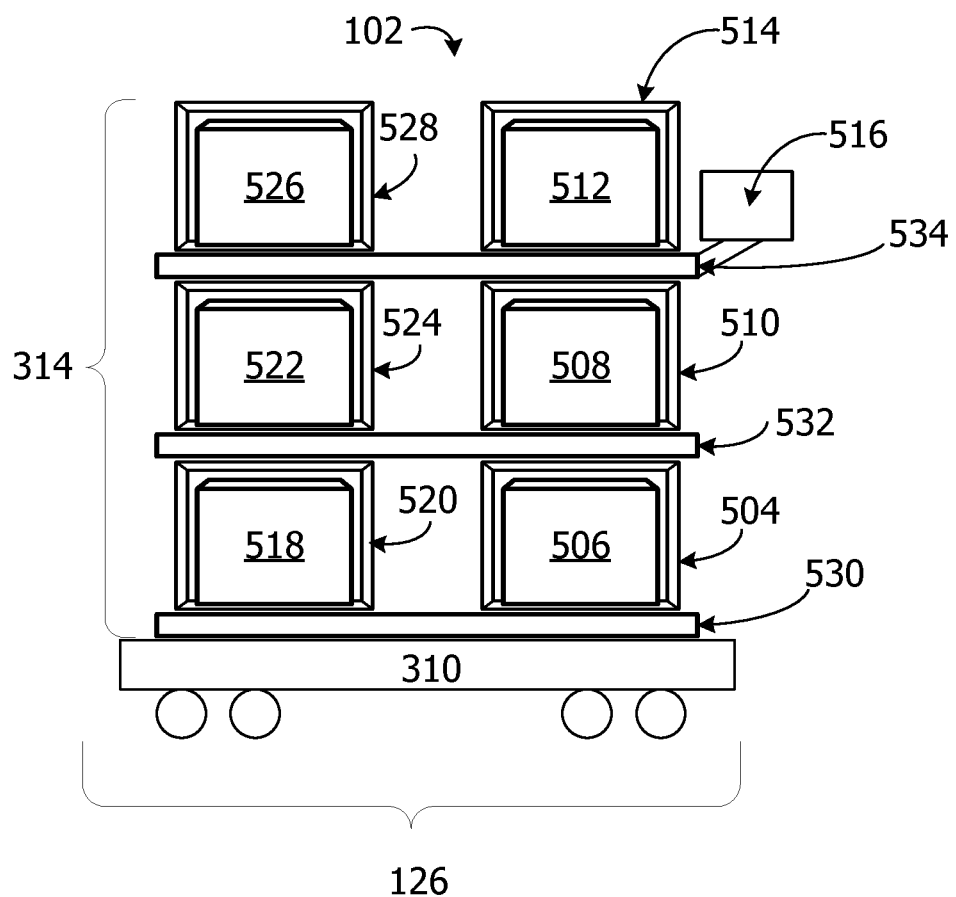
FIG. 5 is an exemplary block diagram illustrating a front view of a set of storage containers on an item storage cart in a closed configuration.

FIG. 5 is an exemplary block diagram illustrating a set of storage containers on the item storage cart 102 in a closed configuration. The item storage cart 102 in some examples includes the set of storage container housings 314 on three vertical levels configured to support a set of six storage containers. In this example, all the containers on the cart are shown in a closed configuration.

A first container housing 504 in this example partially encloses a first storage container 506 in a closed configuration. The first container housing 504 may entirely enclose the first storage container or partially enclose the first storage container. In this example, the first container housing 504 includes a bottom member, two side members and a top member with two open sides to partially enclose the first storage container while enabling the first storage container to slide horizontally outward through either of the open ends.

A second container housing 510 in the set of encloses a portion of a second storage container 508 in a closed configuration. A third container housing 514 encloses a third storage container 512 in a closed configuration. The third container housing may entirely enclose the third storage container or partially enclose the third storage container.

The item storage cart 102 includes a user interface device, such as, but not limited to, a display device 516. The display device 516 outputs/displays a location of an item on a shelf, a location of an item on the cart, a planogram/graphical representation of a planogram showing a location of an item on an item display within the item selection area, or other information of potential interest to a user operating the item storage cart 102.

The display device 516 optionally outputs a notification or alarm alerting the user that an incorrect item has been placed inside a container and/or an item has been placed inside the incorrect container. The notification and/or alarm may also be utilized to notify the user that the incorrect number of instances of an item have been placed inside a container on the cart or removed from a container on the cart. For example, if the user is supposed to place two cans of beans into the third container 512, the cart manager component analyzes weight data to determine how many cans of beans are added to the cart. If only a single can of beans is added, or more than two cans of beans are added to the container, the system outputs a notification or alert on the display device informing the user that an incorrect number of instances of the selected item have been added.

The item storage cart 102 in this example includes two item storage containers supported on each of the three levels. For example, the storage container 518 in the container housing 520 and the storage container 506 are supported on support member 530 at the first level. The storage container 522 in the container housing 524 and the storage container 508 are supported on support member 532 at the second level. The storage container 526 in the container housing 528 and the storage container 5124 are supported on support member 52 at the third level.

The storage containers are supported on the base member 310. The set of wheels 126 are connected to an underside of the base member 310. The set of wheels enable the item storage cart to roll or otherwise move from one location to another.

In the example shown in FIG. 5, the item storage cart 102 includes six storage containers (totes) stacked on three vertical levels on the cart. However, the examples are not limited to this configuration. The item storage cart optionally includes any number of totes on any number of levels. For example, the item storage cart in one example includes eight item storage containers (totes) on four vertical levels. In another example, the item storage cart includes ten item storage containers on five vertical levels.

Likewise, in the example shown in FIG. 5, there are two item storage containers supported on each vertical level. However, the examples are not limited to two item storage containers per level. In other examples, each vertical level on the cart optionally supports a single item storage container, as well as three or more item storage containers. In one example, the item storage cart includes three item storage containers on each level. In another example, the item storage cart includes four item storage carts on each level.

Figure 6:
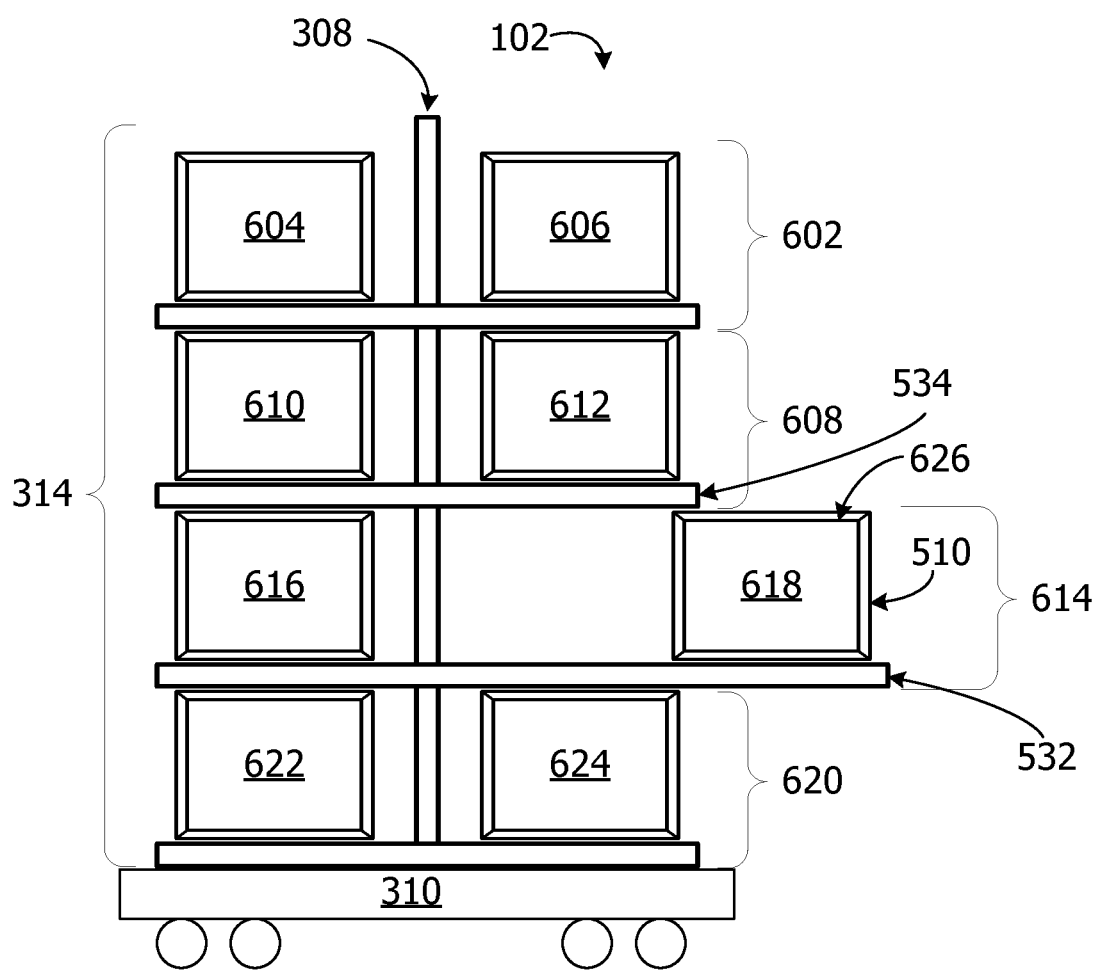
FIG. 6 is an exemplary block diagram illustrating a side-view of a set of storage containers on an item storage cart in an open configuration.

FIG. 6 is an exemplary block diagram illustrating a set of storage containers on the item storage cart 102 in an open configuration. The set of storage containers on the item storage cart 102 in the example includes eight item storage containers arranged on four vertical levels. In this example, the first level 602 from the top includes storage container 604 and storage container 606. The second level 608 includes storage container 610 and storage container 612. The third level 614 includes storage container 616 and storage container 618. The fourth level 620 includes storage container 622 and storage container 624.

When the storage container 618 is pulled or pushed through the open end, an aperture 626 at the top of the first storage container is exposed to enable access to an interior portion of the storage container 618.

In this example, the set of storage containers includes storage container 616 and storage container 618 supported on the support member 532. The support member 532 is an extendable guide, which is fully extended in FIG. 6 to place the storage container 618 into the open configuration.

In this example, the storage container 618 is supported on a fully retracted guide holding the storage container in the open configuration enabling access to an interior storage area within the storage container while the remaining containers are held in the closed configuration preventing access to the interior of those remaining containers. In other words, storage container 618 in FIG. 6 is shown in an open configuration with the support member fully extended. The other storage containers in the set of storage containers on the item storage cart remain in the closed configuration while one item storage container is at least partially slide out of the container housing on the cart (open).

In some examples, when any storage container is in an open configuration, the remaining storage containers are locked into a closed configuration. This prevents items from being placed into the incorrect container. It also prevents one or more items from being removed from a storage container without authorization/approval.

Figure 7:
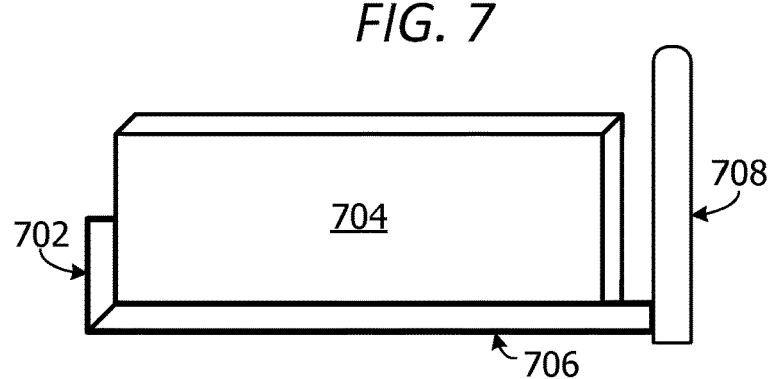
FIG. 7 is an exemplary block diagram illustrating a locking mechanism associated with a storage container on an item storage cart in a closed configuration.

FIG. 7 is an exemplary block diagram illustrating a locking mechanism 702 associated with a storage container 704 on an item storage cart in a closed configuration. The locking mechanism 704 is a device to hold a storage container in a closed configuration, such as, but not limited to, one or more locking mechanisms in the set of locking mechanisms 322 in FIG. 3.

The locking mechanism in this example is an arm or flap which is raised to lock the storage container 704 in the locked configuration. The locking mechanism may be attached to a support member or a container housing. In this example, the locking mechanism 702 is connected to a support member 706 connected to a housing support member 708.

Figure 8:
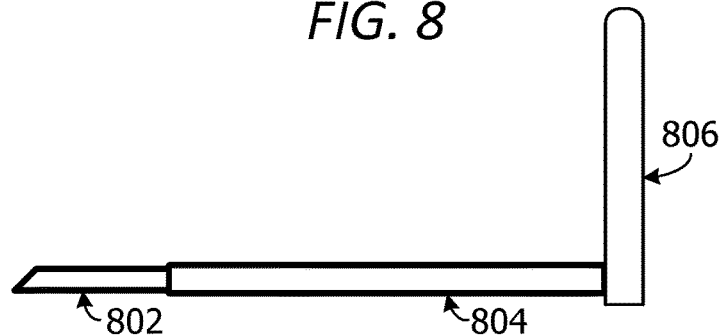
FIG. 8 is an exemplary block diagram illustrating the locking mechanism associated with a storage container on an item storage cart in an open configuration.

FIG. 8 is an exemplary block diagram illustrating the locking mechanism 802 associated with a storage container on an item storage cart in an open configuration. The locking mechanism is a device to hold a storage container in a closed configuration, such as, but not limited to, one or more locking mechanisms in the set of locking mechanisms 322 in FIG. 3.

The locking mechanism 802 in this example is an arm or flap which is lowered to unlock or release the storage container enabling a user to add items to the container. The locking mechanism 802 may be attached to a support member 804 or a container housing. In this example, the support member 804 connects to a housing support member 806.

In some examples, the support member 804 is on a slight downward slope. In these examples, when the locking mechanism 802 disengages, gravity pulls the cart down the sloping support member enabling the container to automatically slide open without human intervention. In other examples, a guide arm or other mechanism pushes the container outward into the open configuration. In yet other examples, the user pulls the storage container out to access the interior of the container. When the user is finished, the user pushes the container backward until the locking mechanism engages or re-engages to hold the container in the closed configuration/prevent the container from sliding out.

In another non-limiting example, the user pushes the container backward and manually re-engages the locking mechanism to hold the storage container in the closed configuration. In these examples, the locking mechanism may include a latch, a bar, a tab, a lip, a clip or any other device for holding the storage container in the closed configuration.

Figure 9:
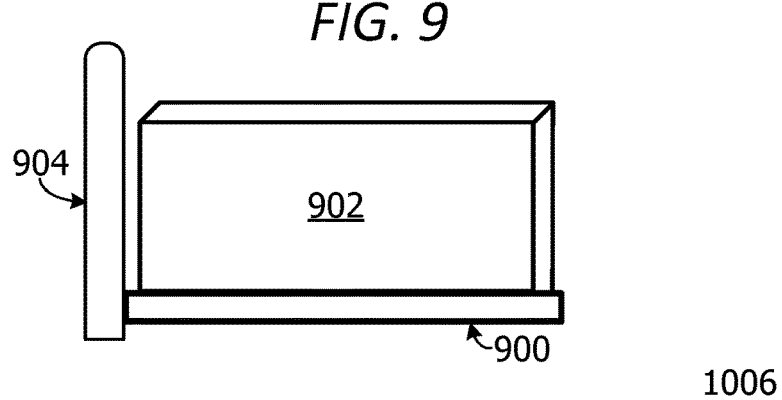
FIG. 9 is an exemplary block diagram illustrating a retracted guide associated with a storage container in a closed configuration.

FIG. 9 is an exemplary block diagram illustrating a retracted guide 900 associated with a storage container 902 in a closed configuration. The retracted guide 900 in this example connects to a housing support member 904. The guide is an extendable guide configured to extend outward when a storage container is opened and retract inward when the storage container is pushed back into the storage container housing on the cart.

Figure 10:
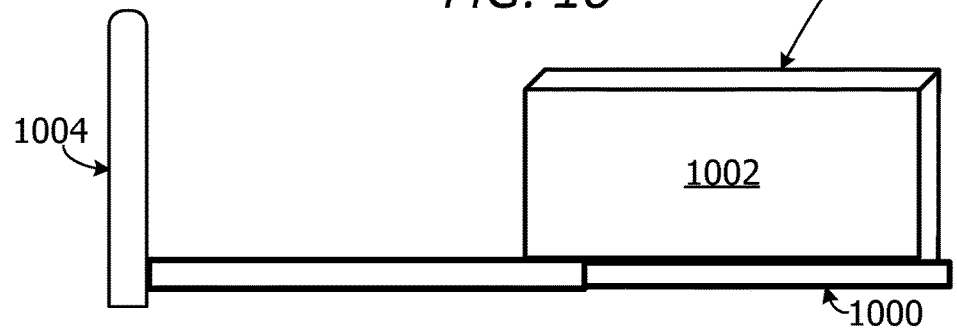
FIG. 10 is an exemplary block diagram illustrating an extended guide associated with a storage container in an open configuration.

FIG. 10 is an exemplary block diagram illustrating an extended guide 1000 associated with a storage container 1002 in an open configuration. The extended guide 1000 in this example connects to a housing support member 1004.

In one example, the guide is connected to a mechanism or motor which automatically moves the storage container 1002 from the closed configuration to the open configuration for pick/place. In the open configuration, an interior 1006 portion of the storage container 1002 is accessible to the user. In other words, items may be added to the interior 1006 via an aperture/opening at the top of the storage container when the storage container is pulled out in the open configuration.

In this example, the guide retracts automatically when the pick or placement is complete for improved safety and efficiency. The automatic retraction further prevents additional incorrect items from being added to a storage container after a correct item has been placed into it or removed from it. The guide further prevents the storage container from being pulled too far out or being removed from the cart prior to completion of the pick/stock.

The guide in some examples is implemented as a bar, a track, or a bracket for partially supporting an edge or other portion of a storage container as the storage container is partially pulled out of the storage container housing to place the container in the open configuration enabling access to the container's interior contents. In other examples, the guide is a pair of bars, tracks or brackets configured to support and guide the storage container as it is partially pulled out the storage container housing. The guide also supports and directs the storage container back into proper alignment within the storage container housing as the storage container is re-inserted or otherwise pushed back into the storage container housing to return the container to the closed configuration.

Figure 11:
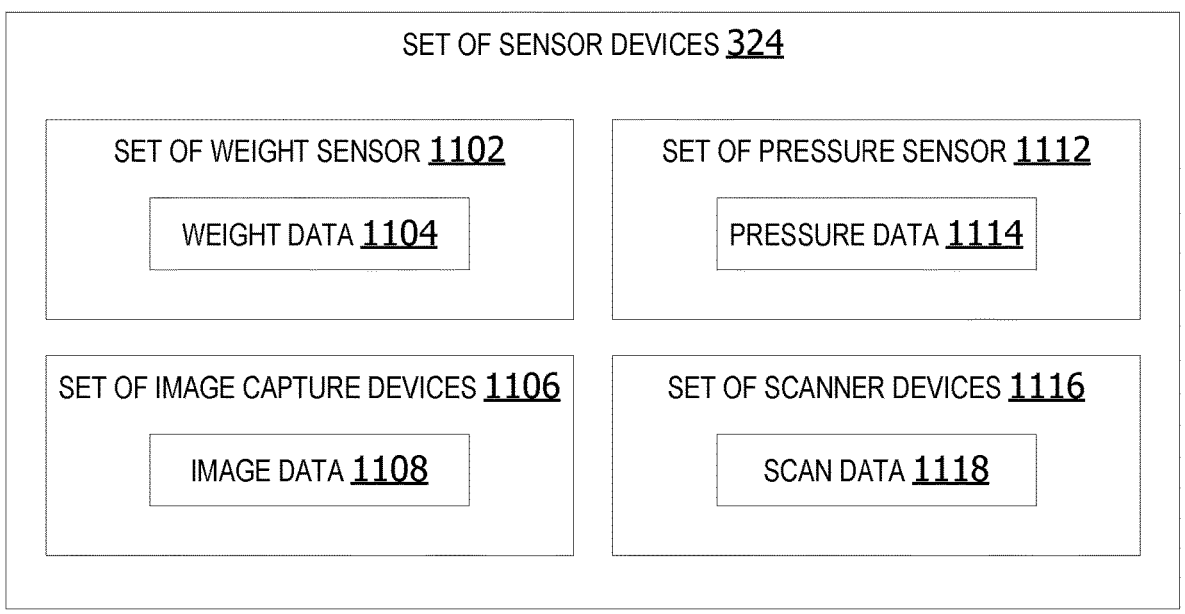
FIG. 11 is an exemplary block diagram illustrating a set of sensor devices.

FIG. 11 is an exemplary block diagram illustrating a set of sensor devices 324. The set of sensor devices 324 includes one or more sensor devices for verifying contents of containers on a cart. The set of sensor devices 324 includes a set of one or more weight sensors 1102, such as, but not limited to, scales for generating weight data 1104. The weight data includes weight changes associated with an increase or decrease in weight associated with each storage container.

The set of sensor devices 324 may optionally include a set of one or more image capture devices 1106 generating image data 1108. The image capture devices may include cameras or infrared (IR) camera.

A set of one or more pressure sensors 1112 may optionally be included. The set of pressure sensors 1112 generate pressure data 1114 associated with each storage container on the cart. The pressure data 1114 is analyzed to determine whether a selected storage container is in an open configuration or a closed configuration.

The set of scanner devices 1116 optionally includes devices for scanning an item identifier, such as, but not limited to, a universal product code (UPC) code, a barcode, a matrix barcode, a radio frequency identification (RFID) code, a quick response (QR) code, or any other code. The set of scanner devices generates scan data 1118 associated with an item scanned by the user. The user in some examples scans a selected item prior to placing the item into a container on the cart. The cart manager component utilizes the scan data to determine which container the scanned item should be placed into.

The scanner device(s) may also be used to scan cases of items instead of scanning individual items. In these examples, the user scans a barcode or other identifier on a case holding one or more items. The user places the case into the appropriate storage container on the cart. In yet another examples, the scanner devices may be used to scan a barcode, electronic shelf label (ESL), QR code, RFID tag or other identifier on a storage container to identify a particular storage container. The scanner devices may include an RFID tag reader, a QR code reader, a UPC code reader, a barcode reader, a matrix barcode reader, etc.

In some examples, the set of weight sensors are integrated into platform trays/support members under each storage container. The weight sensors may be tied into the processing unit to detect incremented/decremented weight levels. The cart manager component analyzes the weight data to determine the location of the weight sensor generating the weight data to identify which storage container had an item removed from it or added to it. The weight sensors also allow the cart manager component to determine where an identified storage container has been placed on the cart and/or determine whether a storage container is present at a particular location (level/position) on the cart.

In other examples, the set of sensor devices may include light sensors, proximity sensors, photoelectric cells and/or any other sensor devices for detecting location and position of items on the cart. In one example, a photocell beam pointing up from a support member (platform) in front of a storage container (tote/bin) is broken when the storage container is moved/slides out. The sensor data indicating the beam is broken confirms that the storage container is removed/pulled. If the wrong container is pulled, the system outputs a notification/alert notifying a user that the wrong bin is pulled.

Figure 12:
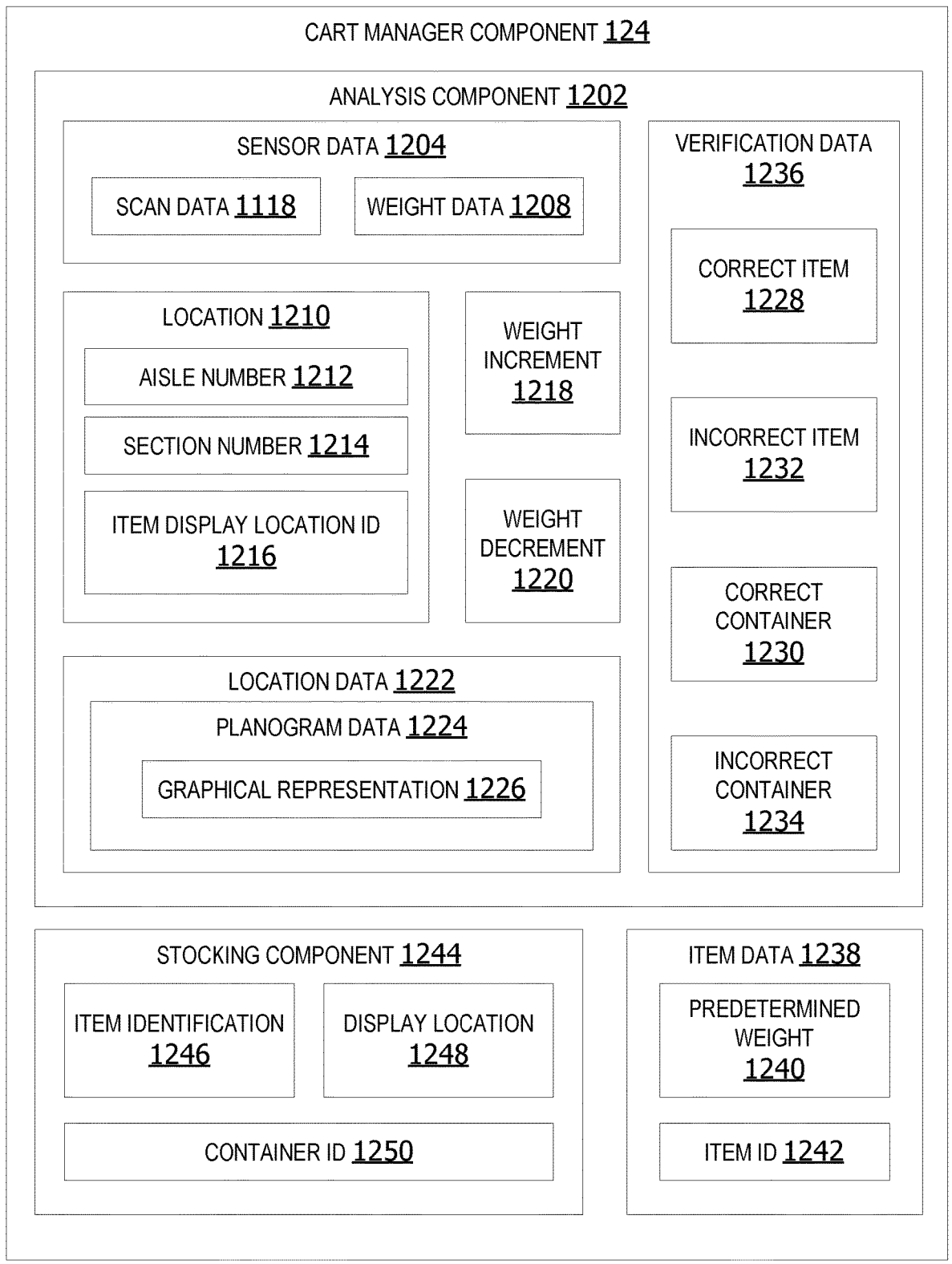
FIG. 12 is an exemplary block diagram illustrating a cart manager component.

FIG. 12 is an exemplary block diagram illustrating a cart manager component 124. The cart manager component 124 includes an analysis component 1202. The analysis component 1202 analyzes sensor data 1204, such as, but not limited to, scan data 1118 generated by a scanner device and/or weight data 1208 generated by a weight sensor. The sensor data 1204 in other non-limiting examples may include pressure data generated by a pressure sensor, temperature data generated by a thermometer or temperature sensor, humidity data generated by a hygrometer, image data generated by a camera, infrared data generated by an infrared sensor, motion data generated by a motion sensor, location data generated by a geolocation sensor, light data generated by a light sensor, or any other type of sensor data generated by one or more sensor devices. A geolocation sensor is a sensor for detecting a location, such as, but not limited to, a beacon transmitter, a beacon receiver, a global positioning satellite (GPS) receiver, a Wi-Fi device, or any other device for determining a location of an item.

The analysis component 1202 analyzes the sensor data 1204 to identify a location 1210 of an item on an item display or other shelf in the item selection area. The location may include an aisle number 1212, a section number 1214 and/or an item display location identifier (ID) 1216.

The analysis component 1202 analyzes sensor data 1204 to determine an amount of weight increment 1218 when an item is added to a container on the cart and/or an amount of weight decrement 1220 when an item is removed from a container on the cart.

In other examples, the analysis component 1202 analyzes sensor data 1204 to generate location data 1222 for the location of a selected item, including planogram data 1224. The planogram data may include a graphical representation 1226 of a display or portion of an item display where an item to be picked is located. The planogram data displayed on the item storage cart in one example includes a picture of a module within a planogram of a store to guide the user to the module. The planogram display adjusts/updates to drill down the picture of the item location on the module to provide the user with a visual of the correct item to select. In an item stocking scenario, the planogram shows a graphical image of the item display to be stocked. The modular-specific image is shown on the display, with a highlighted box around the item to be picked. The display updates to ensure the user pulls items from the correct storage location (bin/tote) at that location in the store to stock shelves. This reduces the amount of time users spend at shelf edge searching for items to pick. It is time savings for picking/stocking. The planogram may also be provided to reduce time expended by customers searching for items while shopping.

The planogram data may be output to the user in other examples via a digital screen or other display on the cart. The display screen shows the appropriate planogram by using the pick path in graphics interchange format (GIF). In this example, no location services are necessary. The picking service directs the geographic path. The planogram is built into ROC store map.

In one example, a user scans each item as the item is picked and placed into the cart. With each pick, there is a scan confirmation. Therefore the system knows to move on to the next item on the list, even if on same modular. If the pick path has 1% milk, chocolate milk, and yogurt on the same modular item display, the system triggers item picking along that path without permitting/allowing for picking items out of order.

If an item is unavailable, the user may utilize the user interface component to report/select "item not found" and initiate an exception flow. The user may also identify/flag planograms errors via the user interface device. Types of issues that might be flagged include items not present in the location indicated on the planogram data, items located on a different/wrong shelf, items located in a different/wrong position than shown on the planogram, and/or a planogram that is completely incorrect for that location. An exception flow is then initiated.

In a non-limiting scenario, when a user notices something is off in the picking process, the user clicks a "flag" button on the user interface (UI). The button may be a physical button or an icon on a graphical user interface. The user provides additional feedback indicating whether the problem is with the modular location or aisle location. The UI opens up and the user clicks/selects the modular/aisle location issue. The list options/problem details associated with the planogram data may include specifying whether an item label is in the wrong spot, whether an item label is missing from the modular/item display, whether the aisle location for the item is incorrect/wrong and/or whether the location area/section provided for the item is wrong.

In another non-limiting example, if the number of "flags" for planogram data/location data associated with a selected item reaches a threshold number, the system alerts a manager or other personnel to address the issue/update the planogram and/or location data associated with the item. Likewise, real-time data from cameras, robotic sensor devices (autonomous robotic camera devices) and/or data feeds may also be utilized to update/modify the planogram data/location data for an item if the number of location data error flags reaches the threshold level.

In still another example, the planogram data may be generated using real-time or near-real-time image data generated by robotic roving camera device(s) autonomously moving throughout the item selection area. The image data is utilized to update the planogram data with real-time image data more accurately showing locations of items, positions of items on displays, numbers of items available, etc. Generic planogram would be a fallback if no Robotic roving camera images are available.

The image data generated by the roving robotic camera devices may be used in other examples to identify the location of an item which is not in its assigned item display area. If an item cannot be found on its normal display space, image data from robotic cameras are retrieved to find the item(s). If a user is picking an item that's supposed to be in an aisle display identified as "J-11", image data may be used to determine the item is actually (incorrectly) located in "K-12".

The robotic camera devices in other examples may communicate with the item storage carts and/or a remote server to update item location data. The communication between the robotic cameras and the item storage cart system enables validation that says if a recent scan in last "X" hours by at least one robotic camera device, the system uses that location/image data instead of the basic (proper) location planogram data for the digital planogram display.

Item location data may be pulled down from a cloud storage or other remote data store and utilized to update the item storage cart planogram display data at the outset of the pick.

The analysis component 1202 in other examples analyzes sensor data 1204, including the weight data, to generate verification data 1236 verifying a correct item 1228 is placed into a correct container 1230 on the cart. If the verification data 1236 indicates an incorrect item is placed into the correct container, an incorrect number of items are placed into a container and/or a correct item is placed into an incorrect/wrong container on the cart, the cart manger component outputs a notification or other alert to the user.

A notification may include an identification of the item, an identification of the container the item was placed into, an identification of the container the item should have been placed into, and/or a location of the item on an item display. The notification/alert may include a flashing light, audio output and/or graphical output.

The cart manager component 124 in some examples analyzes the sensor data 1204 with item data 1238 to generate the location data 1222 and/or the verification data 1236. The item data 1238 may include a predetermined weight 1240 of one or more items and/or an item ID 1242 for a selected item/scanned item. In one example, the cart manger component 124 downloads the item data, including item descriptions and/or item weights, from the data storage device on the cart, a remote server, a cloud storage or other remote data store.

In some non-limiting examples, the cart manager component 124 includes a stocking component 1244. The stocking component utilizes an item identification 1246 to identify a display location 1248 of the identified item and a container ID 1250 of a container on the cart where the identified item should be placed.

Figure 13:
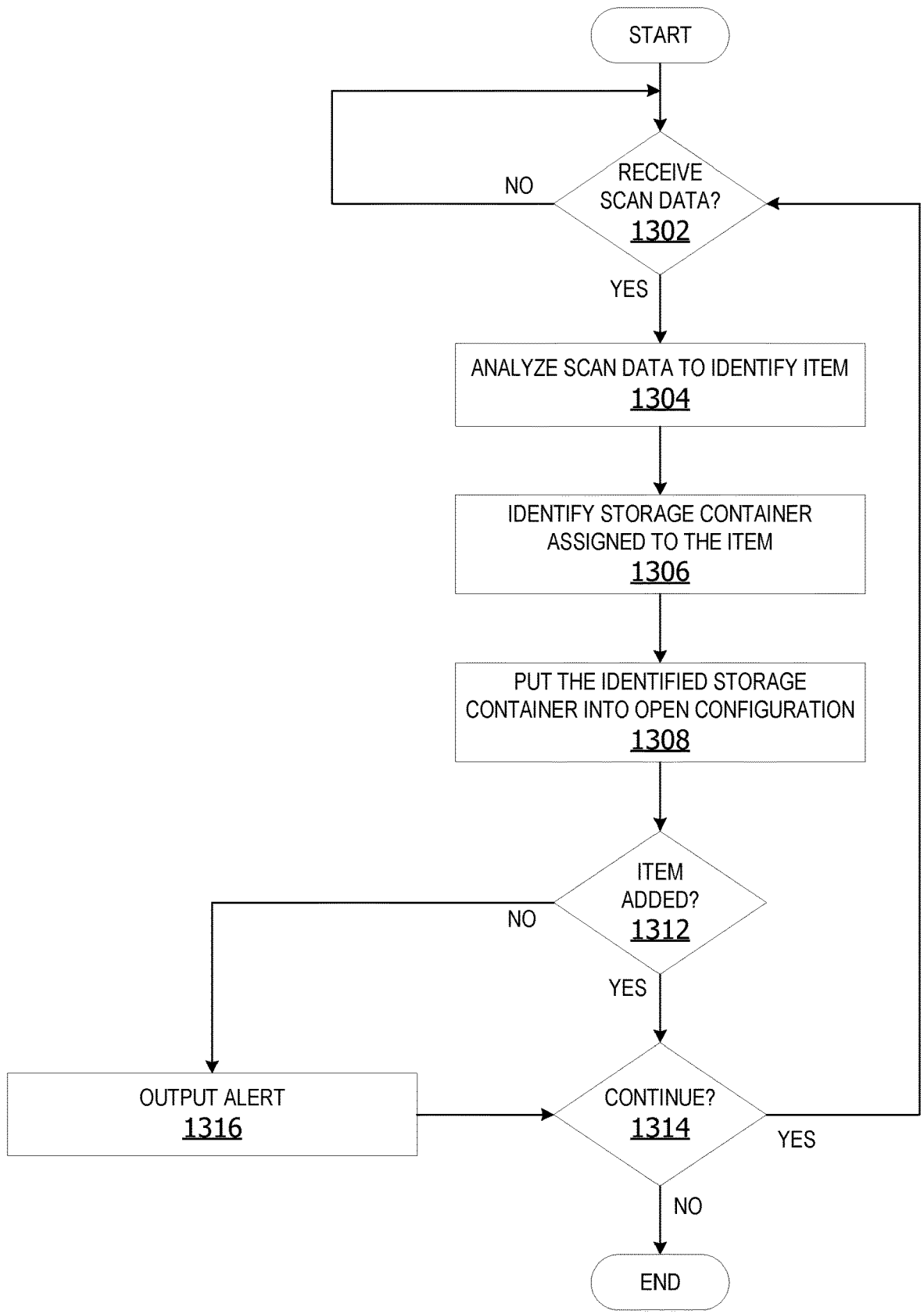
FIG. 13 is an exemplary flow chart illustrating operation of the computing device to manage items on an item storage cart.

FIG. 13 is an exemplary flow chart illustrating operation of the computing device to manage items on an item storage cart. The process shown in FIG. 13 may be performed by a cart manager component, executing on a smart item storage cart, such as the item storage cart 102 in FIG. 1.

The process begins by determining if scan data is received at 1302. The scan data is data generated by a scanner or other sensor device, such as, but not limited to, the scan data 1118 in FIG. 11 and FIG. 12. If yes, the cart manager component analyzes the scan data to identify an item at 1304. The cart manager component identifies a storage container assigned to the item at 1306. The cart manager component puts the identified storage container into an open configuration at 1308. The open configuration is a configuration in which an interior of the storage container is accessible to a user, such as, but not limited to, the storage container 508 into the open configuration as shown in FIG. 6.

The cart manager component analyzes sensor data at 1310 associated with the storage containers. The sensor data is data generated by a set of one or sensor devices, such as, but not limited to, the sensor data 1204 in FIG. 12. The set of sensor devices is a set of one or more sensor devices, such as, but not limited to, the set of sensor devices 324.

The cart manager component determines if the identified item is added to the correct container at 1312. If no, the cart manager component outputs an alert at 1316. The alert is a notification, such as the alert 115 in FIG. 1.

The cart manager component determines whether to continue at 1314. If yes, the cart manager component returns to 1302 and iteratively executes operations 1302 through 1314 until a determination is made not to continue at 1314. The process terminates thereafter.

While the operations illustrated in FIG. 13 are performed by a computing device, aspects of the disclosure contemplate performance of the operations by other entities. For example, a cloud service may perform one or more of the operations.

Figure 14:
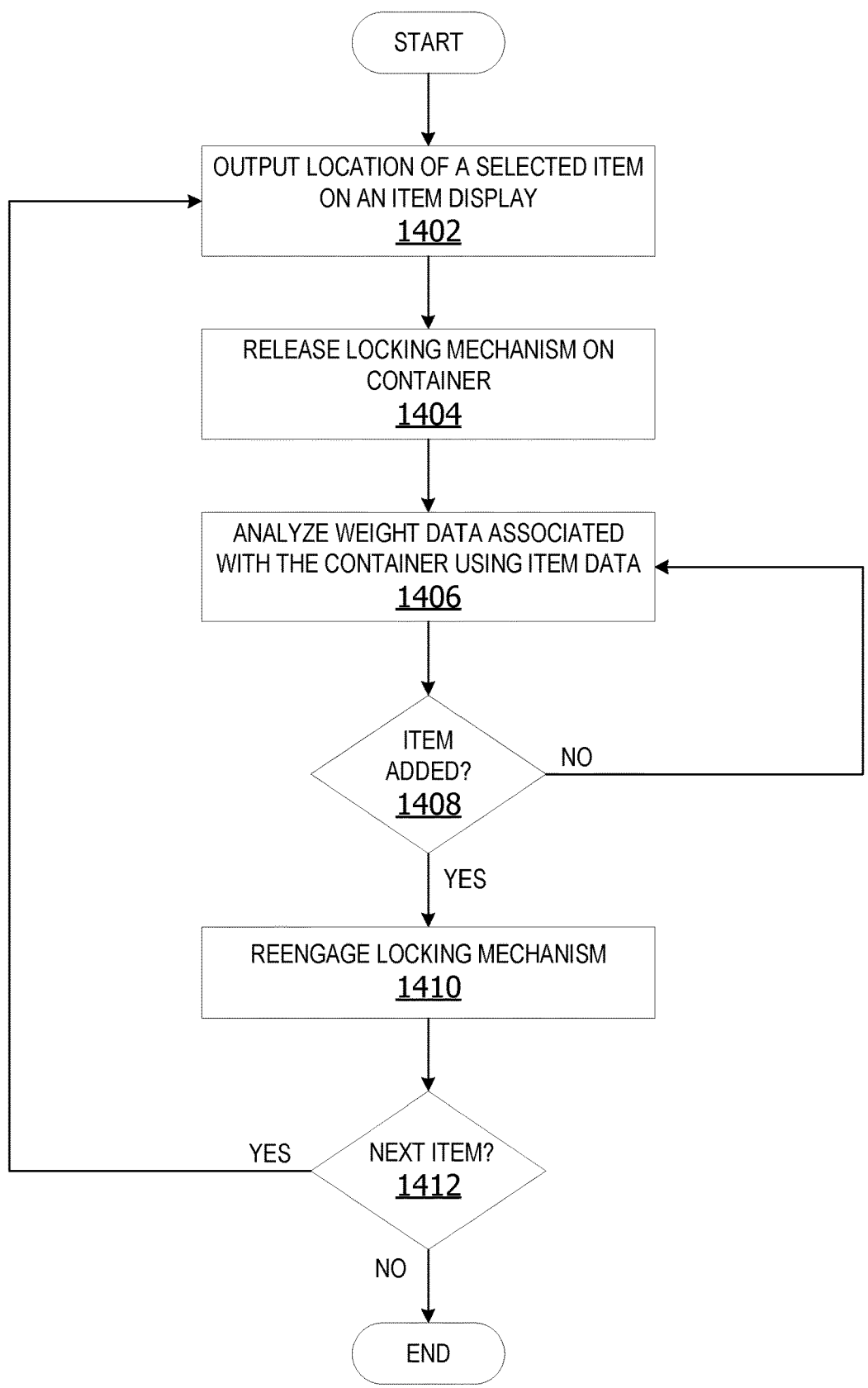
FIG. 14 is an exemplary flow chart illustrating operation of the computing device to manage items on an item storage cart.

FIG. 14 is an exemplary flow chart illustrating operation of the computing device to manage items on an item storage cart. The process shown in FIG. 14 may be performed by a cart manager component, executing on a smart item storage cart, such as the item storage cart 102 in FIG. 1.

The process begins by outputting a location of a selected item on an item display at 1402. The selected item is an item, such as, but not limited to, an item in the set of items 120 in FIG. 1. The cart manager component releases a locking mechanism on a selected container at 1404. The locking mechanism is a device to hold a storage container in a closed configuration, such as, but not limited to, one or more locking mechanisms in the set of locking mechanisms 322 in FIG. 3.

The cart manager component analyzes weight data associated with the container using item data at 1406. The weight data is data generated by scales or other weight sensor devices, such as, but not limited to, the weight data 1208 in FIG. 12. The cart manager component determines whether the item is added to the selected container at 1408. If yes, the cart manager component re-engages the locking mechanism at 1410. The cart manager component determines whether there is a next item to be added to the cart at 1412. If yes, the cart manager component returns to 1402 and iteratively executes operations 1402 through 1412 until there are no additional items to add to the cart at 1412. The process terminates thereafter.

While the operations illustrated in FIG. 14 are performed by a computing device, aspects of the disclosure contemplate performance of the operations by other entities. For example, a cloud service may perform one or more of the operations.

Additional Examples

In some examples, a modified stocking and picking cart is provided which provides planogram data associated with item displays as stocking and picking aids to users. The cart is electric and includes a put-to-light system for picking from shelves to fulfill orders.

In an example scenario, the cart includes storage containers stacked three-levels high for a total of six storage containers on the cart by reducing the gap between levels. Each storage container (bin) pulls out to enable a user to add item(s) to the container or remove item(s) from the container. A sensor device on the container generates sensor data indicating when a container is pulled out/opened by a user making it easier to confirm an item was placed in the appropriate bin. In other words, an item cannot be placed into a container on the cart without moving the cart. Therefore, a sensor device on the container detects opening/accessing of each bin/container when items are placed into the bin or removed from the bin.

In another example, the cart includes a visual display with an interface that displays the shelf/bin location of an item to be picked and placed into a container on the cart. The location display may include a planogram or portion of a planogram graphically depicting the location of the item/ variety of the item on the shelf or other item display. The planogram image includes the location for the product to be picked/stocked by highlighting or otherwise indicating the location on the display screen In yet other examples, each storage container on the cart includes a scale/weight sensor to confirm picks based on the weight increments when an item is added to the container. In the case of more than one quantity of an item (multiple instances) being picked, once one of the items is scanned and placed, the scale determines the proper quantity was picked/placed. If the user is stocking an item display with item from the cart, the cart manager component utilizes the weight data to verify weight decrements correspond to correct items removed from the containers in stocking mode.

When a user scans an item taken off a shelf in one non-limiting example, a fixed light on the cart lights up to indicate which bin the item should be placed into. Each bin on the cart may correspond to a different order. Weight sensors detect correct or incorrect bin placement. The cart generates a notification to output to display indicating whether the item placement is verified as correct or unverified (incorrect). If multiple items are ordered (three instances of an item), the user scans a single item. The cart manager component analyzes weight sensor data to detect three iterations of that item added to the selected container(s).

Alternatively, or in addition to the other examples described herein, examples include any combination of the following:
- the item storage cart includes six item storage containers (totes) on three vertical levels with two item storage containers on each level;
- the item storage cart includes eight item storage containers on four vertical levels with two totes on each level;
- the item storage cart includes ten item storage containers on five vertical levels with two item storage containers on each level;
- the item storage cart includes nine item storage containers on three vertical levels with three item storage containers on each level;
- the item storage cart includes twelve item storage containers on four vertical levels with three item storage containers on each level;
- a communications interface component, implemented on the at least one processor, that receives scan data from at least one scanner device, wherein the scan data is analyzed by the cart manager component to identify the selected item;
- the user interface component, implemented on the at least one processor, outputs an incorrect item placement notification on a display screen on condition the weight data indicates the selected item is placed into an incorrect storage container on the item storage cart;
- a base member comprising a propulsion mechanism;
- a set of wheels coupled to the propulsion mechanism;
- at least one battery associated with the propulsion mechanism;
- a braking mechanism automatically places the item storage cart into a park mode on condition a set of weight sensors detects a weight increment exceeding a threshold maximum weight;
- an alert component, implemented on the at least one processor, that generates an alert on condition weight data generated by a set of weight sensors on the item storage cart indicates an unscheduled item removal from at least one storage container on the item storage cart;
- a stocking component, implemented on the at least one processor, identifies an item located within one or more storage containers on the item storage cart ready for placement onto an item display;
- the user interface component, implemented on the at least one processor, outputs location data on an item display for placement of the identified item, wherein the location comprises an aisle number and a shelf number;
- wherein the location data includes a graphical display of a portion of a planogram identifying the location of the item display assigned to the identified item;
- a sensor device associated with the first storage container, wherein sensor data generated by the sensor device indicates whether the first storage container is in the open configuration or the closed configuration;
- an analysis component, implemented on the at least one processor, analyzes sensor data generated by a set of sensor devices on the item storage cart, including weight data generated by at least one weight sensor associated with each storage container on the item storage cart using item data associated with a plurality of items in an item selection area;
- the item data including a predetermined weight of an instance of each item in the plurality of items;
- the analysis component identifies an item associated with any weight increment or weight decrement associated with a given storage container based on a result of the analysis;
- a second set of sensor devices associated with the second storage container generating second sensor data associated with a second set of items within the second storage container;
- the analysis component, implemented on the at least one processor, analyzes the second sensor data generated by the second set of sensor devices to confirm the second storage container remains unopened;
- a braking mechanism coupled to the set of wheels and a propulsion mechanism;
- at least one battery associated with the propulsion mechanism;
- a navigation component provides navigational data to the propulsion mechanism to enable the item display device to move from a first location to a second location via self-propulsion;
- a user interface component, implemented on the at least one processor, outputs a graphical representation of a location of the selected item, including a portion of a planogram representing at least a portion of an item display;
- a user interface component outputs an incorrect item placement notification on condition analysis of sensor data associated with at least one storage container indicates an incorrect item is removed from the first storage container or the analysis of sensor data associated with at least one storage container indicates the selected item is added to an incorrect storage container;
- an alert component, implemented on the at least one processor, that generates an alert on condition weight data generated by a set of weight sensors on the item storage cart indicates an unscheduled item removal from at least one storage container on the item storage cart;

outputting a location notification of a next selected item to be placed into a next selected storage cart, wherein the location notification includes a graphical image of at least a portion of a location of instances of the selected item on at least one item display within an item selection area;

generating an alert indicating an incorrect item added to a selected storage container on condition the weight data indicates a weight increment associated with the selected storage container is greater than a known weight of an instance of the identified item or the weight increment is less than the known weight of an instance of the selected item;

generating, via the user interface device, an alert indicating an incorrect item removed from the selected storage container on condition the weight data indicates occurrence of a weight decrement;

generating, via the user interface device, an alert indicating an unauthorized item removal from at least one storage container on the storage cart on condition weight data generated by at least one weight sensor associated with the at least one storage container indicates a weight decrement unassociated with authorization of an item removal from the at least one storage container;

generating, via the user interface device, an alert indicating an unauthorized addition of an item to at least one storage container on condition weight data generated by at least one weight sensor associated with the at least one storage container on the storage cart indicates a weight increment unassociated with an authorized addition of at least one item to the at least one storage containers.

At least a portion of the functionality of the various elements in FIG. 1, FIG. 2, FIG. 3, FIG. 4, FIG. 5, FIG. 6, FIG. 7, FIG. 8, FIG. 9, FIG. 10 and FIG. 11 may be performed by other elements in FIG. 1, FIG. 2, FIG. 3, FIG. 4, FIG. 5, FIG. 6, FIG. 7, FIG. 8, FIG. 9, FIG. 10 and FIG. 11, or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10 and FIG. 11.

In some examples, the operations illustrated in FIG. 13 and FIG. 14 may be implemented as software instructions encoded on a computer-readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform tasks or implement abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for verifying contents of containers on an item storage cart. For example, the elements illustrated in FIG. 1, FIG. 2, FIG. 3, FIG. 4, FIG. 5, FIG. 6, FIG. 7, FIG. 8, FIG. 9, FIG. 10 and FIG. 11, such as when encoded to perform the operations illustrated in FIG. 13 and FIG. 14, constitute exemplary means for analyzing scan data received from at least one scanner device; exemplary means for identifying an item for placement into at least one storage container on an item storage cart; exemplary means for identifying a selected storage container assigned to the identified item; exemplary means for outputting a graphical representation of a location of the identified item on an item display within an item selection area; exemplary means for releasing a locking mechanism associated with the selected storage container to enable user access to at least a portion of an aperture associated with the selected storage container; exemplary means for analyzing weight data generated by at least one weight sensor associated with at least the selected storage container to verify the identified item is placed into the selected storage container; exemplary means for re-engaging the locking mechanism associated with the selected storage container on condition the weight data indicates a weight increment associated with the selected storage container corresponds with a known weight of the identified item; and exemplary means for outputting, by the user interface device, a notification indicating failure to detect placement of the identified item into the selected storage container on condition weight data generated by the at least one weight sensor fails to correspond to a predetermined weight of the identified item.

Other non-limiting examples provide one or more computer storage devices having a first computer-executable instructions stored thereon for providing a cart manager component. When executed by a computer, the cart manager component performs operations including analyzing sensor data to verify a correct item is placed into a correct item storage container on a cart, such as a pick-cart or stocking cart; outputting a notification when an item is placed into the wrong container on the cart and/or outputting a notification when an incorrect item is placed into a container on the cart.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

In an exemplary embodiment, one or more of the exemplary embodiments include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system may be reduced significantly. For example, whenever a localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data may include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data to filter out data that may reflect generic background data. In an exemplary embodiment, KRG incrementally sequences all future undefined cached kernels having encoded asynchronous data to filter out data that may reflect generic background data.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A rolling item storage cart comprising:
   a base member comprising a set of wheels;
   a housing support member connected to a portion of the base member, the housing support member comprising a set of storage container support members supporting a set of storage containers, the set of storage containers comprising a first storage container and a second storage container;
   a first storage container support member comprising a first locking mechanism securing the first storage container to the first storage container support member in a closed configuration;
   a second storage container support member comprising a second locking mechanism securing the second storage container to the second storage container support member in the closed configuration;
   a control device comprising a memory communicatively coupled to at least one processor;
   a cart manager component implemented on the at least one processor, wherein the cart manager component identifies a selected item for addition to the first storage container or removal from the first storage container;

the first locking mechanism disengages to release the first storage container, the second locking mechanism remains engaged to prevent opening of the second storage container;

a user interface component, implemented on the at least one processor, configured to output a graphical representation of a location, within the first storage container or the second container, of the selected item; and a set of sensor devices associated with the first storage container generates first sensor data associated with a set of items within the first storage container, wherein the cart manager component analyzes the first sensor data with item data associated with the selected item to verify the selected item is added to the first storage container or removed from the first storage container.

2. The rolling item storage cart of claim 1, wherein:
the set of items is a first set of items,
the set of sensor devices is a first set of sensor devices, and
the rolling item storage cart further comprises:
  a second set of sensor devices associated with the second storage container generates second sensor data associated with a second set of items within the second storage container; and
  the analysis component, implemented on the at least one processor, analyzes the second sensor data generated by the second set of sensor devices to confirm the second storage container remains unopened.

3. The rolling item storage cart of claim 2, further comprising:
  a braking mechanism coupled to the set of wheels;
  a propulsion mechanism coupled to the set of wheels;
  at least one battery associated with the propulsion mechanism; and
  a navigation component provides navigational data to the propulsion mechanism to enable an item display device to move from a first location to a second location via self-propulsion.

4. The rolling item storage cart of claim 1, wherein the graphical representation of the location of the selected item, output by the user interface component, includes a portion of a planogram representing at least a portion of an item display.

5. The rolling item storage cart of claim 1, wherein the user interface component is configured to output an incorrect item placement notification on condition analysis of sensor data associated with at least one storage container indicates an incorrect item is removed from the first storage container or the analysis of the sensor data associated with at the least one storage container indicates the selected item is added to an incorrect storage container.

6. The rolling item storage cart of claim 1, further comprising:
  an alert component, implemented on the at least one processor, that generates an alert on condition weight data generated by a set of weight sensors on the rolling item storage cart indicates an unscheduled item removal from at least one storage container on the rolling item storage cart.

* * * * *